(12) United States Patent
Li

(10) Patent No.: US 8,149,805 B2
(45) Date of Patent: Apr. 3, 2012

(54) METHOD, SYSTEM AND DEVICE FOR OPTIMIZING ROUTING IN MOBILE IPV6

(75) Inventor: Hejun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 860 days.

(21) Appl. No.: 12/176,003

(22) Filed: Jul. 18, 2008

(65) Prior Publication Data

US 2008/0273509 A1    Nov. 6, 2008

Related U.S. Application Data

(63) Continuation of application No. PCT/CN2006/002449, filed on Sep. 19, 2006.

(30) Foreign Application Priority Data

Jan. 20, 2006    (CN) .......................... 2006 1 0033233

(51) Int. Cl.
*H04W 4/00* (2009.01)
(52) U.S. Cl. ........................................................ 370/338
(58) Field of Classification Search .................. 370/328, 370/338, 401; 455/410
See application file for complete search history.

(56) References Cited

U.S. PATENT DOCUMENTS

| | | | |
|---|---|---|---|
| 7,552,234 B2 * | 6/2009 | Thubert et al. ................. | 709/238 |
| 2003/0211842 A1 | 11/2003 | Kempf et al. | |
| 2004/0095913 A1 * | 5/2004 | Westphal ....................... | 370/338 |
| 2005/0055576 A1 * | 3/2005 | Mononen et al. ............. | 713/201 |
| 2005/0273339 A1 | 12/2005 | Chaudhari et al. | |
| 2006/0018291 A1 * | 1/2006 | Patel et al. .................... | 370/335 |
| 2006/0256762 A1 * | 11/2006 | Patel et al. .................... | 370/338 |

FOREIGN PATENT DOCUMENTS

| | | |
|---|---|---|
| CN | 1585406 A | 2/2005 |
| CN | 1706152 A | 12/2005 |
| WO | 2004/047409 A1 | 6/2004 |

OTHER PUBLICATIONS

Chinese Office Action for Chinese Patent Application No. 2006100332337, dated Oct. 23, 2009, and English translation thereof.
European Office Action for European Patent Application No. 06791041.4, dated Mar. 12, 2009.
Nikander, P., et al.; "Mobile IP Version 6 Route Optimization Security Design Background; rfc4225.txt"; IETF Standard; Internet Engineering Task Force; IETF; CH; Dec. 1, 2005; XP015054902; ISSN: 0000-0003; pp. 1-33.
European Search Report for European Application No. 06791041.4, dated Feb. 24, 2009.
International Search Report for International Application No. PCT/CN2006/002449, dated Feb. 1, 2007, and English translation thereof.
Chinese Office Action for Chinese Application No. 2006100332337, dated Oct. 10, 2008, and English translation thereof.

* cited by examiner

*Primary Examiner* — Gary Mui
*Assistant Examiner* — Richard K Chang

(57) ABSTRACT

This disclosure relates to a method, system and device for optimizing routing in a mobile IPv6. The core is that the communication between a mobile node and a correspondence node is performed in a routing optimization mode, while providing a secure verification, so that the care-of address of the mobile node would not be obtained by a distrustful third party or a distrustful correspondence node. Moreover, to further ensure the privacy of the location of the mobile node, the current care-of address of the mobile node is shielded from the correspondence node by separating the binding cache from the correspondence node.

17 Claims, 3 Drawing Sheets

METHOD, SYSTEM AND DEVICE FOR OPTIMIZING ROUTING IN MOBILE IPV6

CROSS-REFERENCE TO RELATED APPLICATIONS

This application is a continuation of International Application No. PCT/CN2006-002449, filed Sep. 19, 2006. This application claims the benefit of Chinese Application No. 200610033233.7, filed Jan. 20, 2006. The disclosures of the above applications are incorporated herein by reference.

FIELD

The disclosure relates to communication technology, and more particular, to a method, system, and device for optimizing routing in mobile IPv6.

BACKGROUND

The statements in this section merely provide background information related to the present disclosure and may not constitute prior art.

With the development of the network technology, and the appearance of massive mobile terminals, such as laptops, personal digital assistants (PDA), mobile phones, and car devices, more and more users can connect to the Internet through the public mobile wireless network at any site by using various terminals. To meet the requirement of the mobile services, the mobile Internet protocol (IP) is imported to the network layer.

The basic principle of the mobile IP is allowing a mobile node to use an original IP address for IP communication while moving, thus ensuring non-interruption and continuity of the upper layer applications carried by the IP network during the moving procedure.

With the expansion of network scale, the Internet Protocol version 6 (IPv6) technology will gradually replace the current Internet Protocol version 6 (IPv4) technology because of the advantage of large address space. The IPv6-based mobile IP, namely, mobile IPv6 technology, depends on the technology advantages of the IPv6 and the improvement on mobile IPv4, and becomes popular in the mobile IP domain, which is more and more widely used.

FIG. 1 shows the basic principle of the mobile IPv6. Referring to FIG. 1. When a mobile node 111 connects to a home network 110, it adopts the same working mode as that of a fixed node. The mobile node 111 detects whether it roams to a foreign network by using the IPv6 neighbor discovery system. A gateway of the IPv6 network periodically sends a router advertisement message which comprises a home network prefix of the gateway. When the mobile node receives the router advertisement message from the gateway, it considers that it has roamed to a foreign network if it finds that the network prefix comprised is different from that of the home network. If the mobile node 111 finds that it has roamed to a foreign network 120, it obtains the care-of address on the foreign network 120 through the address auto configuration with or without the status based on the received router advertisement message. At this time, the mobile node 111 has the home address and the care-of address at one time. Currently, the mobile node 111 and a correspondent partner 130 communicate with each other mainly in two modes.

Mode I can be called as a triangle routing mode. The mobile node 111 registers the care-of address to a home agent 113 through a binding update message. A message sent to the correspondent partner 130 is firstly sent to the home agent 113 by the mobile node 111 through a reverse tunnel, and then forwarded to the correspondent partner 130 by the home agent 113. The correspondent partner 130 of the mobile node 111 sends data packets to the home network 110 of the mobile node according to the home address of the mobile node. Then the home agent 113 will intercept these data packets, and forward these data packets to the mobile node 111 by using a tunnel mechanism based on the current care-of address of the mobile node. That is to say, in this mode, the data packets between the correspondence partner 130 and the mobile node 111 are transferred by the home agent 113.

Mode II can be called as a routing optimization mode. The mobile node 111 registers the care-of address to the correspondence partner 130 through a binding update message. Before the registration, a return routability test process is first carried out between the mobile node 111 and the correspondence partner 130, that is, the mobile node 111 first sends a Home Init Test message and a Care-of Init Test message to the correspondence partner 130. After processing, the correspondence partner 130 returns a Home Test message and a Care-of Test message to the mobile node 111. A source address of a data packet sent by the mobile node 111 to the correspondence partner 130 is the care-of address, while the home address is saved in a destination expansion header of the data packet. Therefore, the data packet can be directly sent to the correspondence partner 130 without being sent to the home agent 113 through the reverse tunnel. If the correspondence partner 130 learns the care-of address of the mobile node through the binding update message, it will use an IPv6 route header to send a data packet directly to the mobile node 111. The first destination address of the data packet is the care-of address, and the second one is the home address. Therefore, the data packet can be sent directly to the mobile node 111 in the foreign network, without transfer by the home agent 113. That is to say, in this routing mode, the service packet is directly transmitted between the mobile node 111 and the correspondence partner 130.

The current two communication modes of the mobile IP have some disadvantages.

In the triangle routing mode, the transmission of the service packet must pass through the home agent. In certain extreme case, if the mobile node is adjacent to a correspondence node (correspondence partner) or the two nodes locate in the same subnet and they are far away from the home agent, the service packet must round a long distance to reach the other party. In this case, the service that essentially could be sent with low cost requires more charge, which may lead to unnecessary time delay, jitter, and packet loss.

The routing optimization mode addresses various concerns with the triangle routing mode. But the care-of address of the mobile node is revealed to the correspondence node. In this way, the correspondence node can obtain the current location of the mobile node by using certain mode and tool, thus uncovering the location of the mobile node. That is to say, it's not ensured that the care-of address can be obtained only by the trusty third party or the correspondence node.

SUMMARY

The disclosure provides a method, system and device for optimizing routing. The communication between a mobile node and a correspondence node is performed in a routing optimization manner, while ensuring the privacy of the mobile node location.

According to one aspect of the disclosure, a method for optimizing routing in a mobile IPv6 includes:

sending a routing optimization request signal to a correspondence node by a mobile node, wherein the correspondence node is required to provide authentication data;

sending a routing optimization response signal to the mobile node by the correspondence node, wherein the routing optimization response signal includes the authentication data of the correspondence node; and communicating by the mobile node and the correspondence node in a routing optimization mode after verification is passed.

Alternatively, the sending the routing optimization request signal to the correspondence node by a mobile node includes sending the routing optimization request signal to a home agent in a tunnel mode and forwarding the routing optimization request signal to the correspondence node by the home agent.

Alternatively, the sending the routing optimization response signal to the mobile node by the correspondence node includes:

sending, by the correspondence node the routing optimization response signal to the home agent of the mobile node; and forwarding, by the home agent, the routing optimization response signal to the mobile node.

Alternatively, when the home agent forwards the routing optimization response signal to the mobile node, the home agent verifies the authentication data in the routing optimization response signal and forwards the verification result to the mobile node.

Alternatively, before communicating by the mobile node and the correspondence node in a routing optimization mode, the method further includes:

sending, by the mobile node, a routing optimization channel testing signal to the correspondence node and sending, by the correspondence node, a channel testing response signal to the mobile node if a routing optimized channel is normal.

According to another aspect of the disclosure, a method for optimizing routing in a mobile IPv6 includes:

sending, by a mobile node, a routing optimization request signal to a routing optimization agent or a correspondence node wherein the routing optimization agent is required to provide authentication data;

sending, by the routing optimization agent, a routing optimization response signal to the mobile node, wherein the routing optimization response signal includes the authentication data of the routing optimization agent; and communicating by the mobile node and the correspondence node in a routing optimization mode through the routing optimization agent after verification is passed.

Alternatively, the sending, by the mobile node, the routing optimization request signal to the routing optimization agent includes:

sending, by the mobile node, the routing optimization request signal to the correspondence node, wherein the routing optimization request signal is intercepted by the routing optimization agent; and between the sending, by the mobile node, the routing optimization request signal to the routing optimization agent or the correspondence node and the sending, by the routing optimization agent, the routing optimization response signal to the mobile node, the method further includes:

analyzing a destination address in the routing optimization request signal;

forwarding the routing optimization request signal to the correspondence node if the routing optimization agent is not authorized to provide a routing optimization function; or sending, by the routing optimization agent, the routing optimization response signal to the mobile node if the routing optimization agent is authorized to provide a routing optimization function.

Alternatively, the sending, by the mobile node, the routing optimization request signal to the routing optimization agent or the correspondence node includes: sending the routing optimization request signal to a home agent in a tunnel mode; and forwarding the routing optimization request signal by the home agent.

Alternatively, the sending, by the routing optimization agent, the routing optimization response signal to the mobile node includes:

sending, by the routing optimization agent, the routing optimization response signal to the home agent of the mobile node; and forwarding, by the home agent the routing optimization response signal to the mobile node.

Alternatively, when the home agent forwards the routing optimization response signal to the mobile node, the home agent verifies the authentication data in the routing optimization response signal and forwards a verification result to the mobile node.

Alternatively, before communicating by the mobile node and the correspondence node in a routing optimization mode, the method further includes:

sending, by the mobile node, a routing optimization channel testing signal to the routing optimization agent or the correspondence node; and sending, by the routing optimization agent, a channel testing response signal to the mobile node if a routing optimized channel is normal.

Alternatively, the communicating by the mobile node and the correspondence node in a routing optimization mode through the routing optimization agent includes:

sending, by the mobile node, a home address and current care-of-address information to the routing optimization agent after the mobile node verifies the routing optimization agent;

saving, by the routing optimization agent, binding information of the home address and the current care-of-address; and changing, by the routing optimization agent, a service packet between the mobile node and the correspondence node according the bound information.

Alternatively, the method also includes performing a mutual authentication between the routing optimization agent and the correspondence node.

According to another aspect of the disclosure, a mobile IPv6 system includes a home agent, a mobile node, a correspondence node and a routing optimization agent, wherein the mobile node is adapted to send a routing optimization request signal, require the routing optimization agent to provide authentication data and verify the routing optimization agent. The routing optimization agent is adapted to send a routing optimization response signal to the mobile node and act as an agent of the correspondence node to communicate with the mobile node after passing a verification, wherein the routing optimization response signal corresponds to the routing optimization request signal and includes authentication data of the routing optimization agent.

Alternatively, the routing optimization agent includes:

a unit for analyzing a routing optimization request signal, adapted to determine whether it is authorized to provide a routing optimization agent function for the correspondence node corresponding to the routing optimization request signal;

a unit for transmitting a routing optimization response signal, adapted to send the routing optimization response signal when determining that it is authorized to provide the routing optimization agent function for the correspondence node.

Alternatively, the routing optimization agent further includes:

a unit for binding cache, adapted to bind cache a signal message sent by the mobile node;

a unit for changing a packet, adapted to change a service packet between the mobile node and a correspondence node according to the binding cache.

According to another aspect of the disclosure, a routing optimization agent includes:

a unit for analyzing a routing optimization request signal, adapted to determine whether it is authorized to provide a routing optimization agent function for a correspondence node after receiving a routing optimization request signal from a mobile node, wherein the correspondence node corresponds to the routing optimization request signal;

a unit for transmitting a routing optimization response signal, adapted to send a routing optimization response signal when determining that it is authorized to provide the routing optimization agent function for the correspondence node, wherein the routing optimization response signal includes authentication data of the routing optimization agent.

Alternatively, the agent further includes:

a unit for binding cache, adapted to bind cache a signal message sent by the mobile node;

a unit for changing a packet, adapted to change a service packet between the mobile node and the correspondence node according to the binding cache.

According to another aspect of the disclosure, a mobile IPv6 system includes a home agent, a mobile node and a correspondence node. The mobile node is adapted to send a routing optimization request signal, require the correspondence node to provide authentication data and verify the correspondence node. The correspondence node is adapted to send a routing optimization response signal to the mobile node and communicate with the mobile node in a routing optimization mode after passing a verification, wherein the routing optimization response signal corresponds to the routing optimization request signal and includes authentication data of the correspondence node.

Alternatively, the home agent forwards the routing optimization request signal and the routing optimization response signal between the mobile node and the correspondence node.

The disclosure ensures that the care-of address of the mobile node is submitted only to the trustful node by verifying the correspondence node or the routing optimization agent. Thus, when the mobile node and the correspondence node communicates in the routing optimization mode, the care-of address of the mobile node is not obtained by a distrustful third party or distrustful correspondence node, thus ensuring the privacy of the location of the mobile node.

In addition, to further ensure the privacy of the location of the mobile node, the optional solution shields the current care-of address of the mobile node from the correspondence node by separating the binding cache from the correspondence node.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

This disclosure provides a method, system and device for optimizing routing. This disclosure introduces a security verification mechanism and ensures safe communication between a mobile node and a correspondence node. Based on this, a routing optimization agent is introduced to act as an agent of the correspondence node to process a routing optimization signal, and ensures the privacy of location by separating the routing optimization agent from the correspondence node.

To describe objects, technical solutions and advantages more clearly, the disclosure is detailed with drawings and embodiments.

Figure 1:
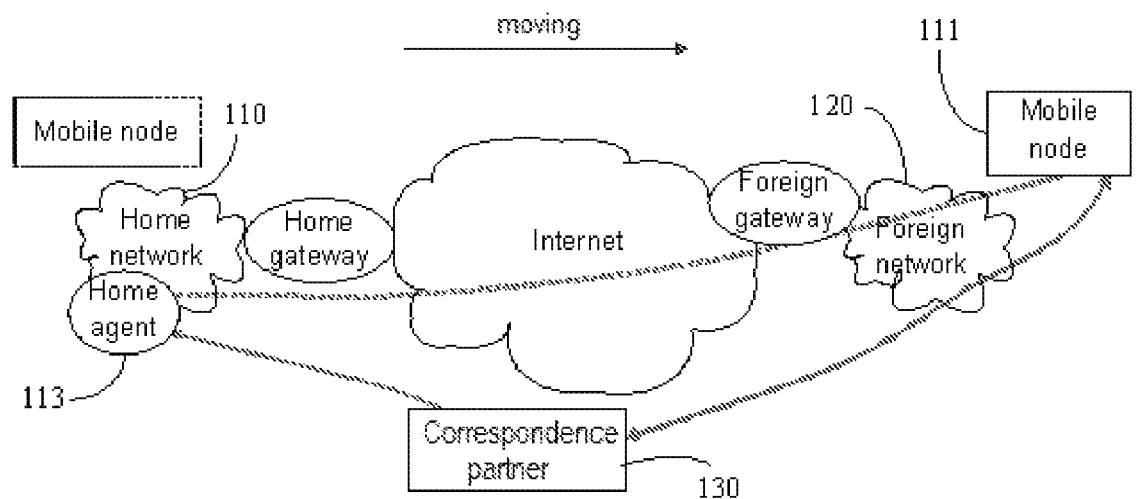
FIG. 1 shows the basic principle of the mobile IPv6 in the prior art.
Figure 2:
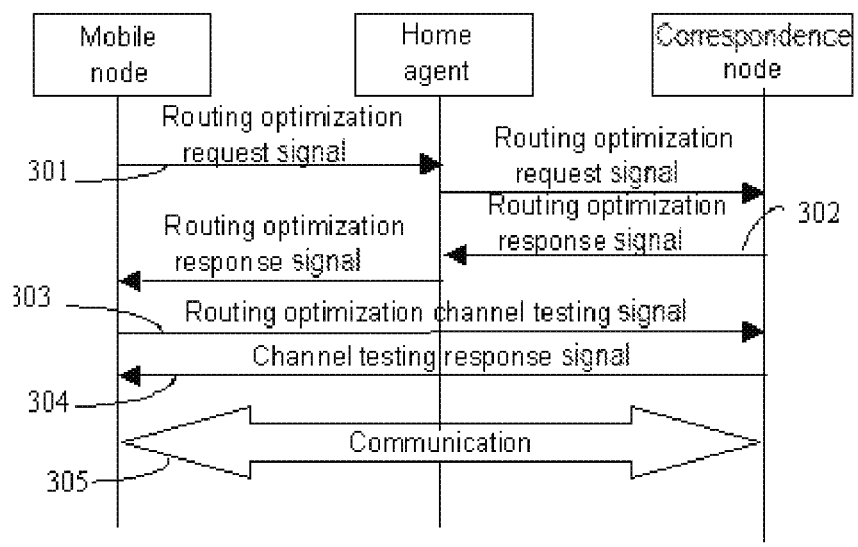
FIG. 2 shows the signal process in an embodiment.

As shown in FIG. 2, the disclosure provides a method for optimizing routing in a mobile IPv6. The method includes the following:

301: A mobile node sends a routing optimization request signal to a correspondence node. The routing optimization request signal comprises identification information which requires the correspondence node to provide authentication data.

In an implementation, the mobile node can first send the routing optimization request signal to a home agent in a tunnel mode. Then the home agent forwards the routing optimization request signal to the correspondence node. The routing optimization request signal from the mobile node forwarded by the home agent has been removed a tunnel encapsulation. In addition, according to the protocol relationship between the home agent and the mobile node, and the strategy of the home agent, the home agent may modify the routing optimization request signal of the mobile node, such as adding a security level identifier.

302: The correspondence node sends a routing optimization response signal to the mobile node. The routing optimization response signal includes identity (ID) verification information of the correspondence node.

In an implementation, if the correspondence node does not support a routing optimization function, it will not send the routing optimization response signal. If the correspondence node supports this function, it sends the routing optimization response signal, and includes its ID verification information in the response signal as required by the request signal.

The correspondence node can send the routing optimization response signal to the home agent of the mobile node. The home agent forwards the routing optimization response signal to the mobile node. When the home agent forwards the routing optimization response signal, it can verify the ID verification information according to an agreement between the home agent and the mobile node or the requirement of its strategy, and forwards the verification result to the mobile node. Alternatively, the home agent does not modify the response signal, but sends the response signal to the mobile node directly in the tunnel mode.

303: The mobile node sends a routing optimization channel testing signal to the correspondence node.

After the mobile node receives the routing optimization response signal from the correspondence node, if the ID verification of the correspondence node is passed or the mobile node passes the ID verification of the correspondence node on its own, the mobile node sends the channel testing signal to the correspondence node to determine whether normal communication can be performed through an optimized channel.

304: The correspondence node sends a channel testing response signal to the mobile node.

After the correspondence node receives the routing optimization channel testing signal sent from the mobile node, it sends the channel testing response signal to the mobile node.

305: The mobile node and the correspondence node communicate directly in a routing optimization mode.

Figure 3:
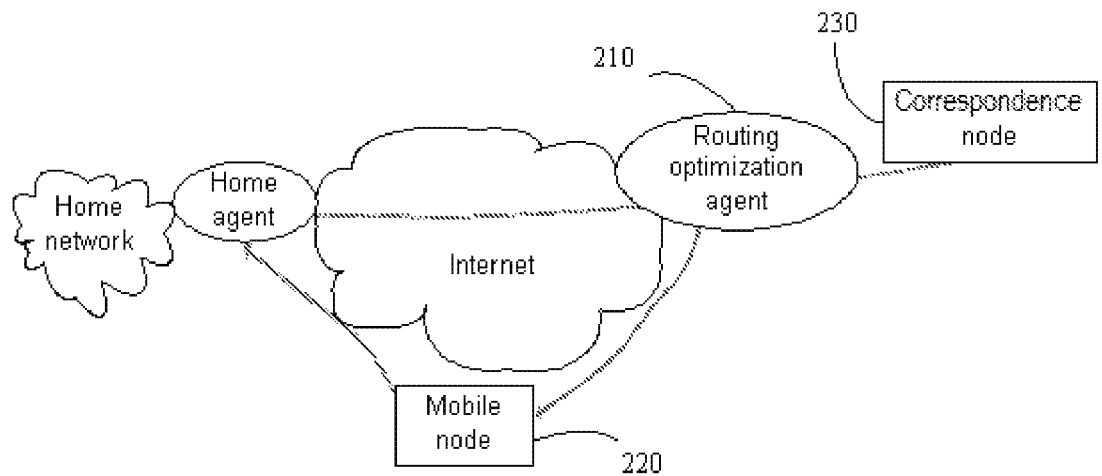
FIG. 3 is a diagram showing basic principle in an embodiment.

As shown in FIG. 3, in another embodiment, a routing optimization agent 210 is added. The routing optimization agent 210 is necessarily transited when the correspondence node 230 communicates with an external network. The routing optimization agent 210 can be a network entity. The network entity can be controlled and operated by a network operator. Common communication users cannot obtain the control privilege on the routing optimization agent. The routing optimization agent can be deployed on an access layer router or a higher layer router. In certain special case, for example, the mobile node 220 and the correspondence node 230 locate in the same network, the routing optimization agent 210 must be deployed on the lowest level router that can be reached by a communication of the two parties.

Figure 4:
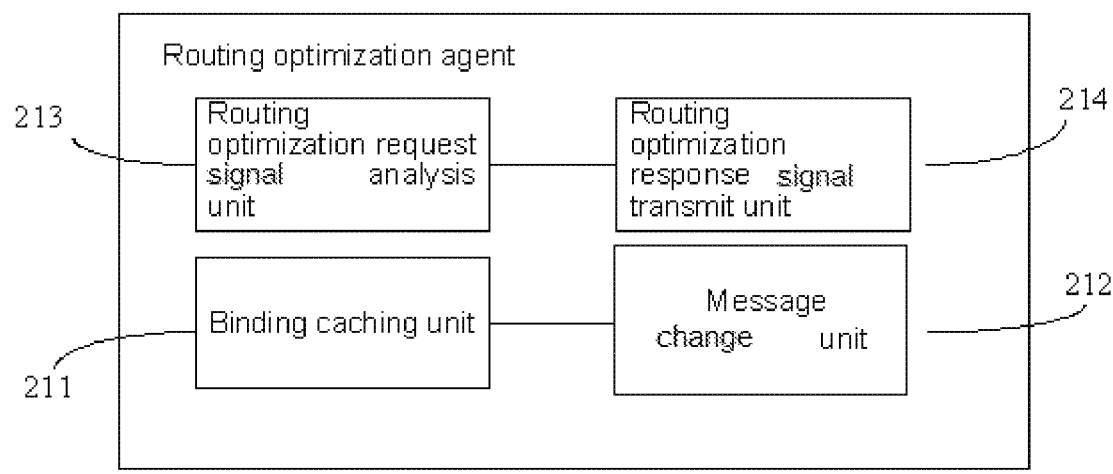
FIG. 4 is a diagram showing a routing optimization agent in the embodiment as shown in FIG. 3.

The routing optimization agent 210 has the following functions: acting as an agent of the correspondence node to process a routing optimization signal. As shown in FIG. 4, the routing optimization agent 210 includes a unit for analyzing a routing optimization request signal 213 and a unit for transmitting a routing optimization response signal 214. The unit 213 is adapted to determine whether it is authorized to provide a routing optimization agent function for the correspondence node corresponding to a request signal. The unit 214 is adapted to send the routing optimization response signal when it is authorized to provide the routing optimization agent function for the correspondence node.

In addition, the routing optimization agent 210 can set a unit for binding cache 211. The unit 211 is adapted to replace the correspondence node to bind cache the signal message sent by the mobile node. In addition, to ensure the privacy of the location of the mobile node, the current care-of address of the mobile node is shielded to the correspondence node. The routing optimization agent 210 can also include a unit for changing a packet 212, which is adapted to change the service packet between the mobile node and correspondence node according to the binding cache.

In an implementation, the routing optimization agent and the correspondence node can provide a mutual authentication. The routing optimization agent authorizes the correspondence node to use its routing optimization service only, and the correspondence node authorizes the routing optimization agent to provide an optimization agent service. As shown, FIG. 5 includes:

401: The correspondence node sends the routing optimization agent a request signal for joining in a local network.

The correspondence node sends the routing optimization agent the request signal for joining in the local network. The signal comprises the ID verification information of the correspondence node, which is convenient for the routing optimization agent to verify the ID of the correspondence node.

402: The routing optimization agent sends a response signal for join in the local network to the correspondence node.

After the routing optimization agent receives the request signal for joining in the local network from the correspondence node, the routing optimization agent sends the response signal for joining in the local network to the correspondence node. The response signal comprises the ID verification information of the routing optimization agent, which is convenient for the correspondence node to determine whether to use the service of the routing optimization agent.

Figure 5:
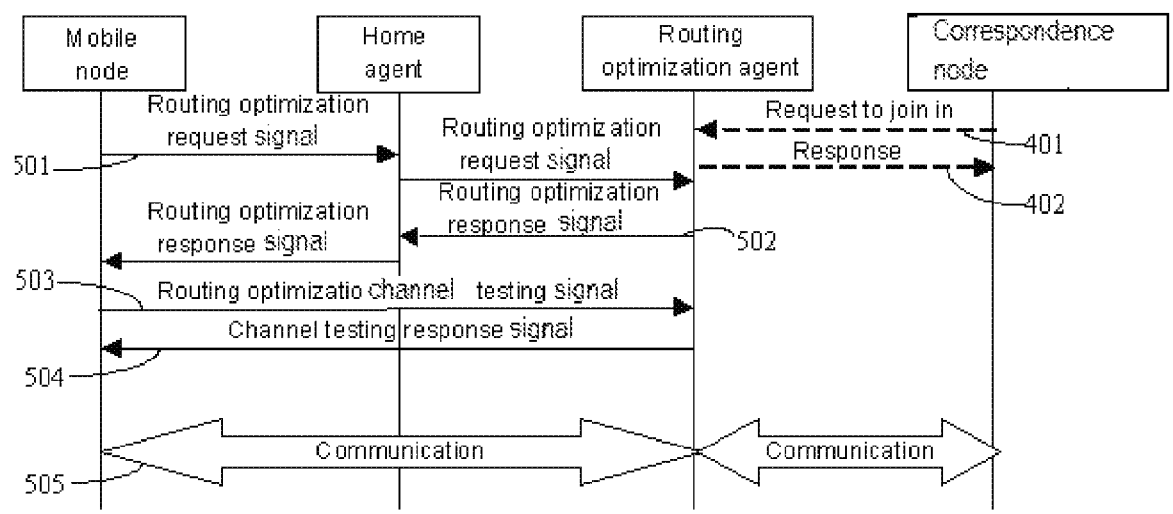
FIG. 5 shows the signal process in an embodiment.

In addition, during an implementation, the mobile node and the routing optimization agent are required to provide a mutual authentication. The mobile node need authenticate the routing optimization agent to determine whether to use the routing optimization mode and whether to send the routing optimization signal. As shown in FIG. 5, the specific steps include:

501: The mobile node sends the routing optimization request signal to the routing optimization agent or the correspondence node. The routing optimization request signal includes identification information which requires the routing optimization agent to provide authentication data.

During the implementation of an embodiment, the mobile node may first send the routing optimization request signal to the home agent in a tunnel mode. The home agent forwards the routing optimization request signal to the routing optimization agent. Wherein the routing optimization request signal from the mobile node forwarded by the home agent has been removed a tunnel encapsulation. In addition, according to the protocol relationship between the home agent and the mobile node, and the strategy of the home agent, the home agent may modify the routing optimization request signal of the mobile node, for example, adding a security level identifier. The mobile node sends the routing optimization request signal to the correspondence node. The signal is intercepted by the routing optimization agent of the correspondence node. The routing optimization agent analyzes the destination address of the signal to determine whether the agent is authorized to provide the routing optimization agent function to the correspondence node.

502: The routing optimization agent sends the routing optimization response signal to the mobile node. The routing optimization response signal comprises the ID verification information of the routing optimization agent.

After receiving the routing optimization request signal from the mobile node, the routing optimization agent verifies the identity of the destination in the request signal. If the identity verification is passed, the routing optimization agent provides service to the correspondence node represented by the destination. The routing optimization agent provides the correspondence node with the routing optimization function, and sends the routing optimization response signal to the mobile node. The response signal comprises the identity data information of the agent. In an implementation, the routing optimization agent may send the routing optimization response signal to the home agent of the mobile node. The home agent forwards the routing optimization response signal to the mobile node. When the home agent forwards the routing optimization response signal, the home agent may verify the identity information according to an agreement between the home agent and the mobile node or the requirement of its strategy. The home agent forwards the verification result to the mobile node. Alternatively, the home agent does not modify the response signal, but send the response signal to the mobile node directly in a tunnel mode.

If the routing optimization agent fails to verify the identity of the destination in the request signal, for example, the local network does not include the correspondence node, or the node does not use the service provided by the routing optimization agent, the routing optimization agent will discard the request signal or directly forwards the signal to the correspondence node. According to a strategy of an operator, to a certain extent the routing optimization agent may modify the request signal.

503: The mobile node sends the routing optimization channel testing signal to the routing optimization agent.

After the mobile node receives the routing optimization response signal from the routing optimization agent, if the identity verification of the routing optimization agent is passed, or the mobile node verifies the identity of the routing optimization agent, the mobile node sends the channel testing signal to the routing optimization agent to determine whether normal communication can be performed through the optimized channel.

504: The routing optimization agent sends the channel testing response signal to the mobile node.

After the routing optimization agent receives the routing optimization channel testing signal sent from the mobile node, the agent sends the channel testing response signal to the mobile node.

505: The mobile node and correspondence node adopt the routing optimization mode for communication through the routing optimization agent.

After the mobile node verifies the identity of the routing optimization agent, the mobile node sends its home address and current care-of-address information to the routing optimization agent. The destination address included in the information may be that of the correspondence node, or the address of the routing optimization agent. The routing optimization agent saves the binding information.

In an embodiment, the binding mapping information is as follows:

In binding cache of CN, (CoA← →HoA)

The mapping of the care-of address (CoA) and the home address (HoA) of the mobile node are saved in the binding cache of the correspondence node (CN).

When a service packet is sent from the mobile node (MN) to the CN, the packet formats via paths and are changed. The routing optimization agent (RoA) is the executer of the changed:

MN←→RoA←→CN

When the service packet is sent from the MN to the CN, the packet format is changed as follows:

(CoA of MN, CN) (HA Option)←→(HoA of MN, CN)

Rule is detailed as follows. The RoA receives the packet from the MN. A source address in the packet is the CoA of the MN, and a destination address is that of the CN. The packet also carries a home agent (HA) option. The source address in the packet forwarded by the RoA is the home address of the MN (HoA), and the destination address is that of the CN and the HA option is removed.

When a service packet is sent from the CN to the MN, the packet format is changed as follows:

(CN, HoA of MN)←→(CN, CoA of MN) (DA Option)

Rule is detailed as follows. The RoA receives the packet from the CN. A source address is that of CN. A destination address is the HoA of the MN. The RoA reserves the source address of the MN. The destination address is changed to the CoA of the MN, and a destination address (DA) option is added.

The above are exemplary embodiments and are not used for limiting the disclosure. In the disclosure, methods of the identity verification are not limited. The traditional password mode or a certificate of authorization (CA) mode can be adopted. Also the performer of the identity verification of the routing optimization agent is not limited. The home agent can verify the identity of the routing optimization agent and send the result to the mobile node. Also, the mobile node can verify the identity of the routing optimization agent.

The disclosure does not strictly limit the signal format and the signal process. This disclosure adds the security verification information based on the current signal process. It is possible to add, delete, or modify the signal and the signal format. Also, the routing optimization is triggered by the mobile node, but the home agent also may perform a decisive function. The mobile node may determine whether to trigger the routing optimization in practice. The home agent also can determine whether to adopt the routing optimization according to its own strategy.

Therefore, variations or replacements that can be easily thought out by a person skilled in the art should be covered in the protection scope 8 of the disclosure.

What is claimed is:

1. A method for optimizing routing in a mobile Internet Protocol version 6, IPv6, comprising:

sending, by a mobile node, a routing optimization request signal to a routing optimization agent or a correspondence node wherein the routing optimization agent is required to provide authentication data;

sending, by the routing optimization agent, a routing optimization response signal to the mobile node, wherein the routing optimization response signal comprises the authentication data of the routing optimization agent; and communicating by the mobile node and the correspondence node in a routing optimization mode through the routing optimization agent after a verification is passed;

wherein the communicating by the mobile node and the correspondence node in a routing optimization mode through the routing optimization agent comprises:

sending, by the mobile node, a home address and current care-of-address information to the routing optimization agent after the mobile node verifies the routing optimization agent;

saving, by the routing optimization agent, binding information of the home address and the current care-of-address; and changing, by the routing optimization agent, a service packet between the mobile node and the correspondence node according to the binding information such that the current care-of-address is shielded from the correspondence node; wherein changing, by the routing optimization agent, a service packet between the mobile node and the correspondence node according to the binding information such that the current care-of-address is shielded from the correspondence node comprises:

changing, by the route optimization agent, according to the binding information, a first service packet sent from the mobile node to the correspondence node, the first service packet having a source address being the current careof-address of the mobile node, a destination address being an address of the correspondence node, and a home agent option, changing the first service packet including replacing the source address with the home address of the mobile node and removing the home agent option;

changing, by the routing optimization agent, according to the binding information, a second service packet sent from the correspondence node to the mobile node, the second service packet having a source address being the address of the correspondence node and a destination address being the home address of the mobile node, changing the second service packet including replacing the destination address with the current care-of-address of the mobile node and adding a destination address option.

2. The method of claim 1, wherein the sending, by the routing optimization agent, the routing optimization response signal to the mobile node comprises:

sending, by the routing optimization agent, the routing optimization response signal to a home agent of the mobile node; and forwarding, by the home agent the routing optimization response signal to the mobile node.

3. The method of claim 1, wherein the sending, by the mobile node, the routing optimization request signal to the routing optimization agent or the correspondence node comprises:

sending the routing optimization request signal to a home agent in a tunnel mode; and forwarding the routing optimization request signal by the home agent.

4. The method of claim 1, before communicating by the mobile node and the correspondence node in a routing optimization mode, further comprising:

sending, by the mobile node, a routing optimization channel testing signal to the routing optimization agent or the correspondence node; and sending, by the routing optimization agent, a channel testing response signal to the mobile node if a routing optimized channel is normal.

5. The method of claim 1, further comprising:

performing a mutual authentication between the routing optimization agent and the correspondence node.

6. The method of claim 1, wherein the sending, by the mobile node, the routing optimization request signal to the routing optimization agent comprises: sending, by the mobile node, the routing optimization request signal to the correspondence node, wherein the routing optimization request signal is intercepted by the routing optimization agent; and between the ending, by the mobile node, the routing optimization request signal to the routing optimization agent or the correspondence node and the sending, by the routing optimization agent, the routing optimization response signal to the mobile node, further comprising:

analyzing a destination address in the routing optimization request signal;

forwarding the routing optimization request signal to the correspondence node if the routing optimization agent is not authorized to provide a routing optimization function; or sending, by the routing optimization agent, the routing optimization response signal to the mobile node if the routing optimization agent is authorized to provide a routing optimization function.

7. The method of claim 2, wherein the home agent verifies the authentication data in the routing optimization response signal and forwards a verification result to the mobile node when the home agent forwards the routing optimization response signal to the mobile node.

8. The method of claim 3, wherein the home agent verifies the authentication data in the routing optimization response signal and forwards a verification result to the mobile node when the home agent forwards the routing optimization response signal to the mobile node.

9. The method of claim 6, wherein the sending, by the mobile node, the routing optimization request signal to the routing optimization agent or the correspondence node comprises:

sending the routing optimization request signal to a home agent in a tunnel mode; and forwarding the routing optimization request signal by the home agent.

10. The method of claim 6, wherein the home agent verifies the authentication data in the routing optimization response signal and forwards a verification result to the mobile node when the home agent forwards the routing optimization response signal to the mobile node.

11. The method of claim 6, wherein the sending, by the routing optimization agent, the routing optimization response signal to the mobile node comprises:

sending, by the routing optimization agent, the routing optimization response signal to a home agent of the mobile node; and forwarding, by the home agent the routing optimization response signal to the mobile node.

12. The method of claim 6, before communicating by the mobile node and the correspondence node in a routing optimization mode, further comprising:

sending, by the mobile node, a routing optimization channel testing signal to the routing optimization agent or the correspondence node; and sending, by the routing optimization agent, a channel testing response signal to the mobile node if a routing optimized channel is normal.

13. The method of claim 6, further comprising:

performing a mutual authentication between the routing optimization agent and the correspondence node.

14. The method of claim 11, wherein the home agent verifies the authentication data in the routing optimization response signal and forwards a verification result to the mobile node when the home agent forwards the routing optimization response signal to the mobile node.

15. A mobile Internet Protocol version 6, IPv6, system, comprising a home agent, a mobile node, a correspondence node and a routing optimization agent, wherein the mobile node is adapted to send a routing optimization request signal, require the routing optimization agent to provide authentication data and verify the routing optimization agent;

the routing optimization agent is adapted to send a routing optimization response signal to the mobile node and act as an agent of the correspondence node to communicate with the mobile node after passing the verification, wherein the routing optimization response signal corresponds to the routing optimization request signal and comprises the authentication data of the routing optimization agent wherein the routing optimization agent further comprises:

a unit for binding cache, adapted to bind cache a signal message sent by the mobile node; and a unit for changing a packet, adapted to change a service packet between the mobile node and the correspondence node according to the binding cache such that the current care-of-address is shielded from the correspondence node, wherein the unit for changing a packet, adapted to change, according to the binding cache, a first service packet sent from the mobile node to the correspondence node, wherein the first service packet has a source address being the current care-of-address of the mobile node, a destination address being an address of the correspondence node, and a home agent option, wherein the unit for changing a packet changes the first service packet by at least replacing the source address with the home address of the mobile node and removing the home agent option; and change, according to the binding cache, a second service packet sent from the correspondence node to the mobile node, wherein the second service packet has a source address being the address of the correspondence node and a destination address being the home address of the mobile node, wherein the unit for changing a packet changes the second service packet by at least replacing the destination address with the current care-of-address of the mobile node and adding a destination address option.

16. The system of claim 15, wherein the routing optimization agent comprises:
   a unit for analyzing a routing optimization request signal, adapted to determine whether it is authorized to provide a routing optimization agent function for the correspondence node;
   a unit for transmitting a routing optimization response signal, adapted to send the routing optimization response signal when determining that it is authorized to provide the routing optimization agent function for the correspondence node.

17. A routing optimization agent, comprising:
   a unit for analyzing a routing optimization request signal, adapted to determine whether it is authorized to provide a routing optimization agent function for a correspondence node after receiving a routing optimization request signal from a mobile node, wherein the correspondence node corresponds to the routing optimization request signal;
   a unit for transmitting a routing optimization response signal, adapted to send a routing optimization response signal when determining that it is authorized to provide the routing optimization agent function for the correspondence node, wherein the routing optimization response signal comprises authentication data of the routing optimization agent wherein the routing optimization agent further comprises:
   a unit for binding cache, adapted to bind cache a signal message sent by the mobile node; and
   a unit for changing a packet, adapted to change a service packet between the mobile node and the correspondence node according to the binding cache such that the current care-of-address is shielded from the correspondence node, wherein the unit for changing a packet, adapted to change, according to the binding cache, a first service packet sent from the mobile node to the correspondence node, wherein the first service packet has a source address being the current care-of-address of the mobile node, a destination address being an address of the correspondence node, a home agent option, wherein the unit for changing a packet changes the first service packet by at least replacing the source address with the home address of the mobile node and removing the home agent option; and change, according to the binding cache, a second service packet sent from the correspondence node to the mobile node, wherein the second service packet has a source address being the address of the correspondence node and a destination address being the home address of the mobile node, wherein the unit for changing a packet changes the second packet by at least replacing the destination address with the current care-of-address of the mobile node and adding a destination address option.

* * * * *